United States Patent
Botu et al.

(10) Patent No.: US 11,644,609 B2
(45) Date of Patent: May 9, 2023

(54) LIGHT GUIDE PLATE AND TRANSPARENT ILLUMINATION SYSTEM UTILIZING THE SAME

(71) Applicant: CORNING INCORPORATED, Corning, NY (US)

(72) Inventors: Venkatesh Botu, Corning, NY (US); Roni Daniel Levi, Corning, NY (US); Christian Alexander Rothenbach Stacey, Wilmington, NC (US); Andrew Joseph Sullivan, Painted Post, NY (US); James Andrew West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/363,655

(22) Filed: Jun. 30, 2021

(65) Prior Publication Data

US 2021/0405278 A1    Dec. 30, 2021

Related U.S. Application Data

(60) Provisional application No. 63/046,101, filed on Jun. 30, 2020.

(51) Int. Cl.
  *F21V 8/00*    (2006.01)
(52) U.S. Cl.
  CPC ........... *G02B 6/0041* (2013.01); *G02B 6/003* (2013.01); *G02B 6/0051* (2013.01)

(58) Field of Classification Search
  CPC ..... G02B 6/0055; G02B 6/0021; B60Q 3/208
  See application file for complete search history.

(56) References Cited

U.S. PATENT DOCUMENTS

| | | | |
|---|---|---|---|
| 9,059,378 B2 | 6/2015 | Verger et al. | |
| 9,310,041 B2 | 4/2016 | Pfeil | |
| 9,612,386 B2 | 4/2017 | Berard et al. | |
| 9,845,047 B1* | 12/2017 | Salter | B60Q 1/268 |
| 10,099,606 B2* | 10/2018 | Salter | B60Q 3/745 |
| 10,202,075 B2 | 2/2019 | Lefevre et al. | |
| 2009/0251917 A1 | 10/2009 | Wollner et al. | |

(Continued)

FOREIGN PATENT DOCUMENTS

| CN | 205523597 U | 8/2016 |
|---|---|---|
| CN | 205768560 U | 12/2016 |

(Continued)

OTHER PUBLICATIONS

European Patent Application No. 21182549.2, Extended European Search Report dated Dec. 3, 2021; 10 pages; European Patent Office.

*Primary Examiner* — Eric T Eide

(57) ABSTRACT

A transparent illumination system and related light guide plate is provided. The system is configured to facilitate total internal reflection propagation of light through the light guide plate despite low index of refraction differences between the glass material of the light guide layer and the adjacent layer. The system includes a light source, such as a laser diode, and an optical element to fan out light from the light source in the plane of the light guide plate. The light guide plate includes internal light extraction features.

12 Claims, 6 Drawing Sheets

(56) References Cited

U.S. PATENT DOCUMENTS

| | | | |
|---|---|---|---|
| 2010/0045894 A1* | 2/2010 | Itoh | G02B 6/0025 349/61 |
| 2011/0249695 A1* | 10/2011 | Kuksenkov | B82Y 20/00 372/45.01 |
| 2012/0104790 A1* | 5/2012 | Plavetich | B60Q 3/208 296/146.16 |
| 2012/0320621 A1* | 12/2012 | Kleo | B32B 17/10018 362/558 |
| 2013/0039059 A1 | 2/2013 | Montgermont et al. | |
| 2014/0085924 A1* | 3/2014 | Li | G02B 6/0025 362/606 |
| 2014/0204601 A1 | 7/2014 | Bäuerle et al. | |
| 2015/0140301 A1 | 5/2015 | Fisher et al. | |
| 2015/0298601 A1* | 10/2015 | Bott | B32B 17/10541 362/520 |
| 2017/0139109 A1 | 5/2017 | Gierens et al. | |
| 2017/0232824 A1* | 8/2017 | Salter | B60Q 3/208 362/509 |
| 2018/0074251 A1* | 3/2018 | Berard | B60Q 3/208 |
| 2018/0086028 A1 | 3/2018 | Berard et al. | |
| 2018/0118096 A1 | 5/2018 | Beach | |
| 2018/0215312 A1 | 8/2018 | Salter et al. | |
| 2021/0157160 A1* | 5/2021 | Li | G02B 27/425 |
| 2021/0294021 A1* | 9/2021 | Romero | G02B 6/0065 |

FOREIGN PATENT DOCUMENTS

| | | |
|---|---|---|
| CN | 107073887 A | 8/2017 |
| JP | 2001-171429 A | 6/2001 |
| JP | 2008-174132 A | 7/2008 |
| WO | 2017/116057 A1 | 7/2017 |
| WO | 2017/186747 A1 | 11/2017 |
| WO | 2018/083771 A1 | 5/2018 |
| WO | 2020/247233 A1 | 12/2020 |

\* cited by examiner

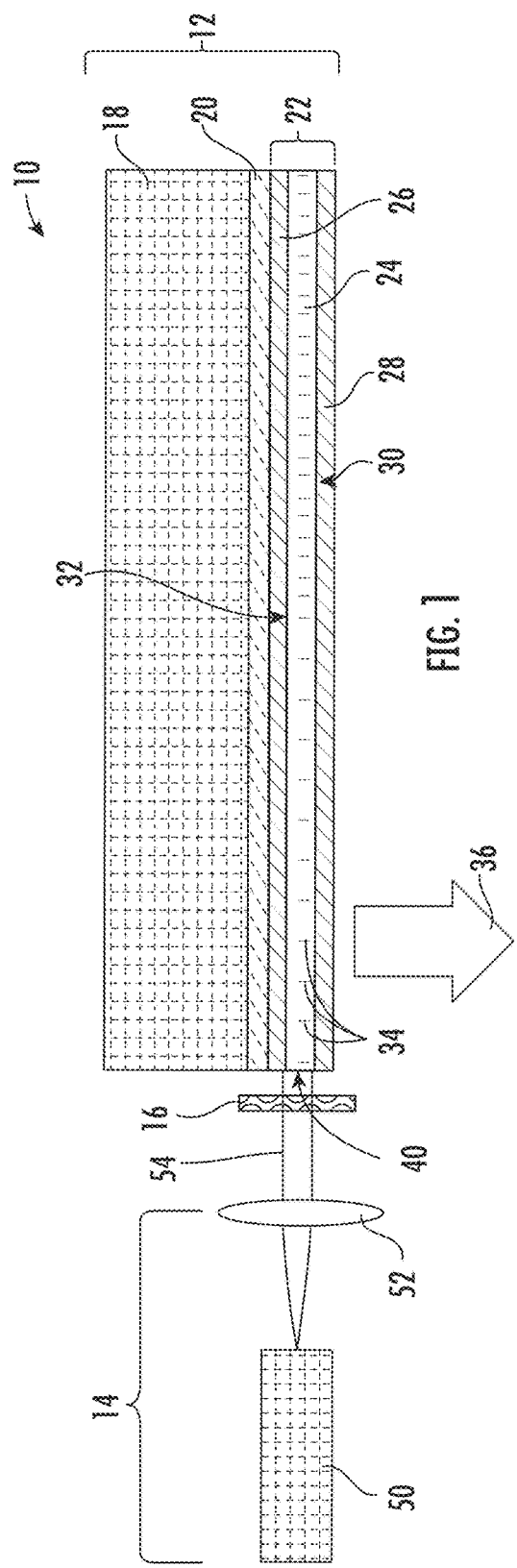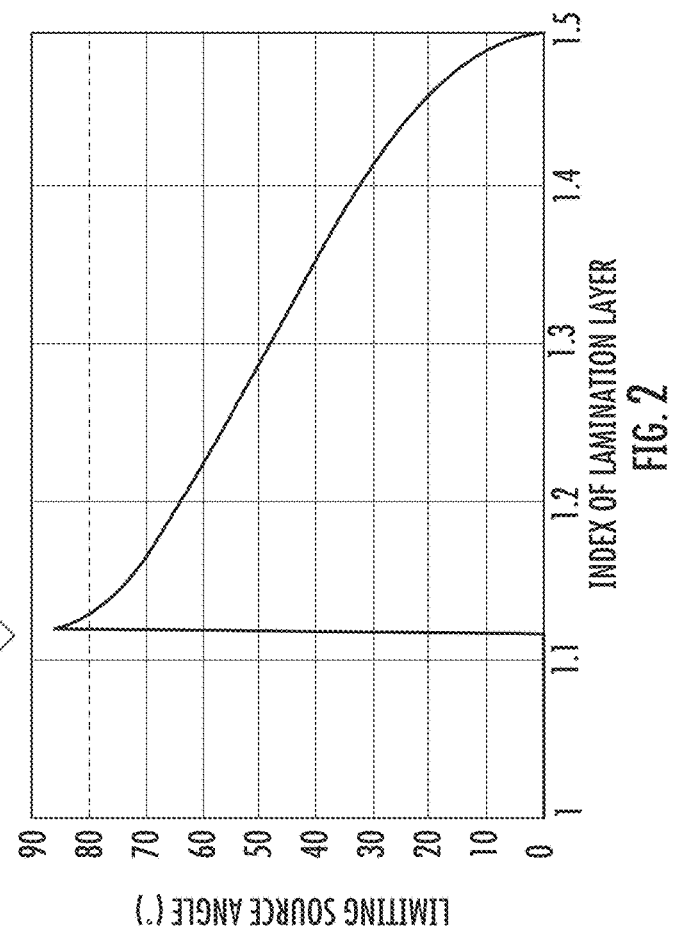
FIG. 1
FIG. 2

LIGHT GUIDE PLATE AND TRANSPARENT ILLUMINATION SYSTEM UTILIZING THE SAME

CROSS-REFERENCE TO RELATED APPLICATIONS

This application claims the benefit of priority under 35 U.S.C. § 119 of U.S. Provisional Application Ser. No. 63/046,101 filed on Jun. 30, 2020, the content of which is relied upon and incorporated herein by reference in its entirety.

BACKGROUND

The disclosure relates generally to light guide plates and more particularly to a light guide plate used for a transparent illumination system. There are many applications for transparent glass articles, such as windows, doors, sunroofs, skylights, etc. Typically, such transparent devices do not include devices that also deliver illumination light out of a major surface of the glass article.

SUMMARY

One embodiment of the disclosure relates to transparent illumination system including a light diffusing, light guide layer, a strengthened structural glass layer coupled to the light guide layer and a light source optically coupled to the minor edge surface of the light guide layer. The light diffusing, light guide layer includes a first glass material, a first major surface, a second major surface opposite the first major surface, a minor edge surface connecting the first major surface to the second major surface and a plurality of light extraction features. The transparent illumination system includes an optical element located between the light source and the minor edge surface of the light guide layer, and the optical element is configured to increase an angular emission of light from the light source in a plane perpendicular to the minor edge surface. Light from the light source is transmitted across the light guide layer via total internal reflection, and the light extraction features are configured to direct light out of the light guide layer and through the first major surface.

An additional embodiment of the disclosure relates to a light-diffusing, light guide plate includes a first glass material, a first major surface, a second major surface opposite the first major surface and a minor edge surface connecting the first major surface to the second major surface. The light-diffusing, light guide plate includes a central region located between the first and second major surfaces, a first exterior region extending from the central region to the first major surface, and a second exterior region extending from the central region to the second major surface. The light-diffusing, light guide plate includes a thickness measured between the first major surface and the second major surface of 0.3 mm to 5 mm, a width greater than 20 cm and a length greater than 20 cm. The light-diffusing, light guide plate includes a high transmittance, Tx, greater than 70% at wavelengths of light between 550 nm through 500 mm and a plurality of light extraction features located in the central region, wherein the first and second exterior regions are substantially devoid of light extraction features.

An additional embodiment of the disclosure relates to a light-diffusing, light guide plate including a central glass layer. The central glass layer includes a first glass material, a first major surface, a second major surface opposite the first major surface, a minor edge surface connecting the first major surface to the second major surface and a plurality of light extraction features configured to direct light out of the central glass layer and through the first major surface. The light-diffusing, light guide plate includes a first cladding layer formed from a second glass material different from the first glass material, and the first cladding layer is directly coupled to the first major surface. The first glass material has a first index of refraction and the second glass material has a second index of refraction. The first index of refraction is greater than the second index of refraction, and a difference between the first index of refraction and the second index of refraction is greater than 0.01 and 0.2.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a side view of an illumination system including a light guide plate, according to an exemplary embodiment.

FIG. 2 is a graph demonstrating the maximum out-of-plane angle of light source used to maintain total internal reflection at the interface with the major surfaces of a light guide plate for different indices of refraction, according to an exemplary embodiment.

DETAILED DESCRIPTION

Figure 3:
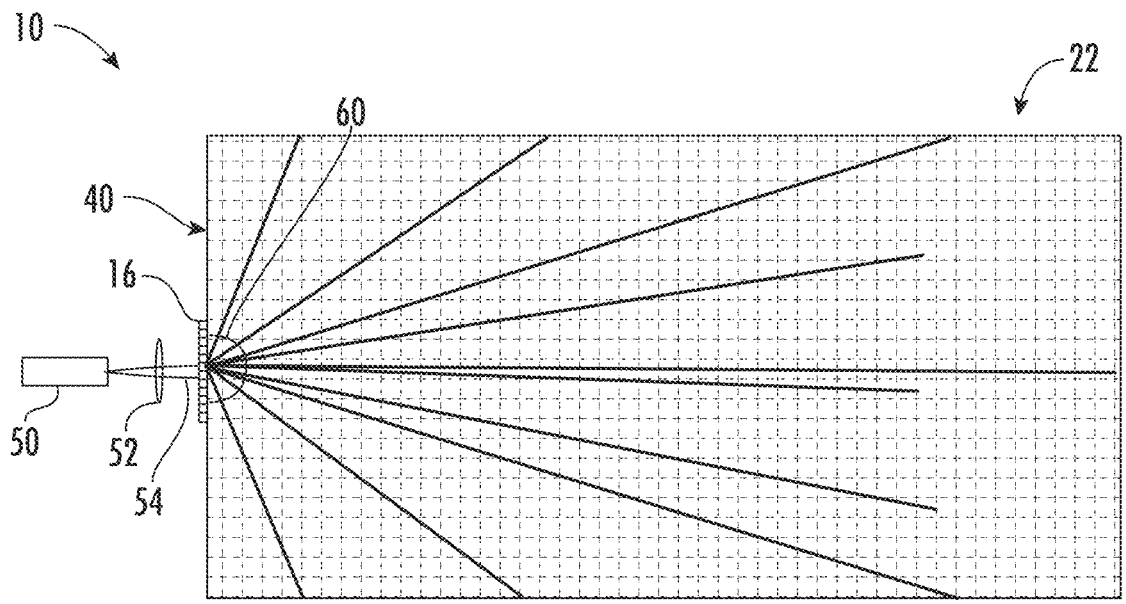
FIG. 3 is a top view of the illumination system of FIG. 1, according to an exemplary embodiment.

Referring generally to the figures, various embodiments of an illumination system including a transparent (e.g., see-through, clear; allowing through-passage of visible light such that objects therebehind may be seen therethrough) light guide plate are shown and described. In general, there are a number of applications in which utilizing a transparent structure (e.g., a window, glass door, sunroof, sky light, etc.) as an illumination device is desirable. In a specific application, utilizing an automotive sunroof as an overhead or dome light in a vehicle is desirable. However, in many such applications a light guide plate is directly attached to other high index materials in a glass laminate article (e.g., the optical adhesive layer materials, such PVB, common in automotive laminate applications) which provides a challenge for waveguide transmission through the light guide plate due to the low index of refraction (IR) difference between the light guide layer and the typical adjacent layer. Because of the tight critical angle requirement for waveguide propagation in such a design, Applicant has developed an approach to achieving waveguide propagation in a light guide plate even with a low IR differences between a light guide layer and the adjacent layer.

As will be discussed in more detail below, the designs discussed herein utilize a light source with a low angular emission (spread of light from the source) range (at least in the direction of the major surfaces of the light guide plate) to allow light coupled into the light guide plate to propagate via total internal reflection (TIR) despite the low IR difference with adjacent layers. However, Applicant has further determined that such light sources tend to also have low angular emission in the plane within in the glass plate (e.g., a plane generally parallel to the major surfaces of the glass and/or perpendicular to a minor edge surface of the glass plate) which in turn results in unsatisfactory or uneven light distribution within the plate. As such, Applicant has determined that use of an optical element that increases the angular emission of the light in this plane results in good light distribution within the glass plate while also allowing for use a relatively small number of high brightness, light generating devices, as compared to some light guide plate designs that utilize many LEDs surrounding the light guide plate to achieve satisfactory light distribution within the glass plate.

Further, to achieve a desired illumination pattern or an even illumination of light exiting through one of the surfaces of the light guide plate, the light guide plate includes light extraction features (LEFs) embedded within the glass material of the light guide plate. Applicant has determined that by locating the LEFs away from the exterior surfaces of such devices the illumination performance can be improved.

For example, Applicant has determined that many illumination applications for a light diffusing (spreading, widening), light guide (control, influencing) plate are utilized in environments where the index of refraction at the external surface of a glass article is hard to control, e.g., due to contaminants, fingerprints, water, etc., that may be in contact with one of the surfaces of a glass article of such a device. This localized change in IR difference may result in unintended light leakage at such locations decreasing the performance of the illumination device. In such applications, Applicant has addressed this problem by designing a light guide plate in which most or all of the LEFs are located spaced from the exterior surface that such surface contaminant issues have little or no impact on the illumination properties of the systems discussed herein.

Referring to FIG. 1, a transparent illumination system 10 is shown according to an exemplary embodiment. In general, transparent illumination system 10 includes a glass laminate article 12, a light source 14 and an optical element 16. In general, glass laminate article 12 is a multilayer component having one or more glass layers, that may serve as a window, glass door, sunroof, skylight, etc. in a wide variety of applications, such as structural, vehicular and/or architectural applications.

Light source 14 generates light that is coupled into a light guide layer of glass laminate article 12. Optical element 16 is an optical device configured to enhance light distribution within the light guide layer and/or to facilitate coupling of light into the light guide layer. Details of light source 14 and optical element 16 are discussed in detail below.

Glass laminate article 12 includes a structural glass layer 18, a first intermediate layer, shown as polymer interlayer 20, a light guide plate, shown as multilayer light guide plate 22. In general, structural glass layer 18 is a relatively thick layer of glass material, such as strengthened (having compression on exterior surfaces offset by tension elsewhere; e.g., ion-exchanged, chemically tempered, thermally tempered), tempered or non-tempered glass, such as a thermally tempered soda lime glass. Structural glass layer 18 provides the primary structural function to glass laminate article 12. In various embodiments, structural glass layer 18 is low-iron soda lime glass, or tinted soda lime glass.

In the embodiment shown, polymer interlayer 20 is an optical adhesive layer that couples structural glass layer 18 to multilayer light guide plate 22. In a specific embodiment, polymer interlayer 20 is polyvinyl butyral (PVB). In other embodiments, polymer interlayer 20 is a modified PVB, such as acoustic PVB, which is designed to reduce sound transmission through glass laminate article 12 by a certain amount, e.g., PVB designed to reduce sound transmission through the glass laminate article 12 by up to 5 dBs. In another embodiment, polymer interlayer 20 is a solar radiation limiting PVB, which is designed to reduce infrared transmission through glass laminate article 12 from solar radiation, e.g., PVB designed to transmit less than 30% of infrared radiation from the sun through the glass laminate article 12. In other embodiments, polymer interlayer 20 is ethylene vinyl acetate or SentryGlas®.

In the embodiment shown, light guide plate 22 includes a light diffusing, light guide layer, shown as waveguide sheet 24, a second intermediate layer, show as a first cladding layer 26, and an external layer, show a second cladding layer 28. Second cladding layer 28 is coupled to a first major surface 30 of waveguide sheet 24, and first cladding layer 26 is coupled to a second major surface 32 of waveguide sheet 24. In specific embodiments, second cladding layer 28 is directly coupled to a first major surface 30 of waveguide sheet 24, and first cladding layer 26 is directly coupled to a second major surface 32 of waveguide sheet 24. In the embodiment shown, polymer interlayer 20 is located between first cladding layer 26 and structural glass 18.

In some embodiments, additional layers (e.g., polymer interlayer 20) within laminated glass article 12 tend to have very poor transmission properties that may rapidly absorb light if such layers were optically coupled to the light guide layer, such as waveguide sheet 24. Thus, in such embodiments, cladding layer 26 optically isolates the light guide sheet 24 from polymer interlayer 20 and cladding layer 28 protects the other major surface of sheet 24 from surface contaminates that may impact illumination performance.

As shown in the embodiment of FIG. 1, light guide plate 22 is formed entirely from glass materials. In such embodiments, Applicant has determined that the all-glass configuration enables high-temperature operation such as in automotive applications. In addition, the all-glass configuration of light guide plate 22 enables resistance to environmental conditions such as heat, humidity, UV radiation, salt, cleaning solvents, body oils, water and other chemicals. This all glass design of the light guide plate is contrasted with other arrangements that may use optical plastic layers and/or surface printed light extraction features that do not handle temperature or harsh environmental conditions as well as the all glass light guide plate discussed herein.

While glass laminate article 12 can be sized and/or structured for a wide range of applications, in specific embodiments, glass laminate article 12 is sized for an automotive glass application and specifically an automotive sunroof application. In such embodiments, waveguide sheet 24 has a thickness measured between first major surface 30 and second major surface 32 of 0.3 mm to 5 mm. Thicknesses of the first and second cladding layers 26 and 28 are between 1 micrometer and 1000 micrometers. In some such embodiments, structural glass layer 18 has a thickness of 0.5 to 4 mm. In various embodiments, glass article 12 has width and length dimensions for use in a structural, vehicular or architectural application. In specific embodiments, glass article 18 has a width greater than 20 cm and/or a length greater than 20 cm.

In various embodiments, glass laminate article 12 may be rectangular, square, circular or any other shape as desired for a particular application. In various embodiments, glass laminate article 12 may be flat. In various other embodiments, glass laminate article 12 may be curved. In such embodiments, glass laminate article 12 may curved along one or two axes. In various embodiments, the minimum radius of curvature along one or two axes of curvature is 500 mm, preferably 1000 mm, and more preferably 2000 mm.

Waveguide sheet 24 includes a plurality of light extraction features (LEFs) 34 located in a central region of sheet 24. Waveguide sheet 24 includes a first exterior region located between the central region with LEFs 34 and first major surface 30, and a second exterior region located between central region with LEFs 34 and second major surface 32. In specific embodiments, the first and second exterior regions of waveguide sheet 24 are substantially devoid of LEFs. In specific embodiments, the number of LEFs in the exterior regions of waveguide sheet 24 are less 1% of the number of LEFs in the central region of waveguide sheet 24, and in an even more specific embodiment, there are no LEFs in the exterior regions of waveguide sheet 24. Similarly, in some embodiments including cladding layers 26 and 28, cladding layers 26 and 28 are substantially devoid of LEFs. In specific embodiments, the number of LEFs in cladding layers 26 and 28 are less 1% of the number of LEFs in the central region of waveguide sheet 24, and in an even more specific embodiment, there are no LEFs in cladding layers 26 and 28.

In general, waveguide sheet 24 acts as a waveguide receiving light from light source 14 and propagating light throughout waveguide sheet 24 via total internal reflection. LEFs 34 are features that cause light within waveguide sheet 24 to scatter and to be directed out of waveguide sheet 24. In the embodiment shown, at least some of the scattered light is directed through first major surface 30 in the direction of arrow 36. LEFs 34 are arranged in a pattern designed to achieve illumination in the direction of arrow 36 in a manner desired (e.g., uniform illumination in direction of arrow 36, illumination in a desired pattern in the direction of arrow 36, etc.). In this manner, light represented by arrow 36 provide for illumination in the direction of arrow 36 while glass article 12 is able to provide the transparent/window type function of a glass article.

In one embodiment, LEFs 34 are laser-induced subsurface features having an index of refraction that is different than adjacent region of the first glass material of sheet 24. In other embodiments, LEFs 34 are inclusions of a material with different index of refraction than the surrounding material of sheet 24. In yet another embodiment, LEFS 34 are voids or air-filled regions located within sheet 24.

In specific embodiments, LEFs 34 are made by a pulsed laser. In specific embodiments, the pulsed laser is a Nd-YAG laser with a wavelength of 266 nm, 532 nm or 1064 nm and/or with pulse lengths in the nanosecond, picosecond and femtosecond range. The pulsed laser may also have a beam profile that is Gaussian or non-diffracting Bessel-like profiles.

As shown in FIG. 1, LEFs 34 are perpendicular to major surfaces 30 and 32 of sheet 24. In one such embodiment, LEFs 34 are positioned within sheet 24 in a pattern that produces uniform spatial illumination in the direction of arrow 36. In another such embodiment, LEFs 34 are positioned within sheet 24 in a pattern that produces a desired non-uniform spatial illumination pattern.

One approach to allowing a glass sheet to function as a waveguide is to design a laminate structure in which low index of refraction materials are located at the major surfaces of the waveguide layer. As will be understood, in such approaches, the high index of refraction differential between the glass material of the waveguide layer and the adjacent material allows for TIR light propagation within the waveguide layer over a wide range of incident angles of light entering the waveguide.

In contrast to this approach to a waveguide plate, in various designs discussed herein, Applicant has determined that use of glass cladding layers and/or adjacent layers of optical adhesive (see e.g., FIG. 6) next to waveguide sheet 24 provide for various design advantages, despite resulting in low index of refraction differences. Because use of glass cladding layers and/or optical adhesive layers adjacent the waveguide sheet 24 results in relatively low IR differences between surfaces 30 and 32 of waveguide sheet 24 and the adjacent layers, TIR propagation within sheet 24 is more sensitive to the angle of incidence of light within central sheet. This relationship is illustrated in FIG. 2.

Figure 6:
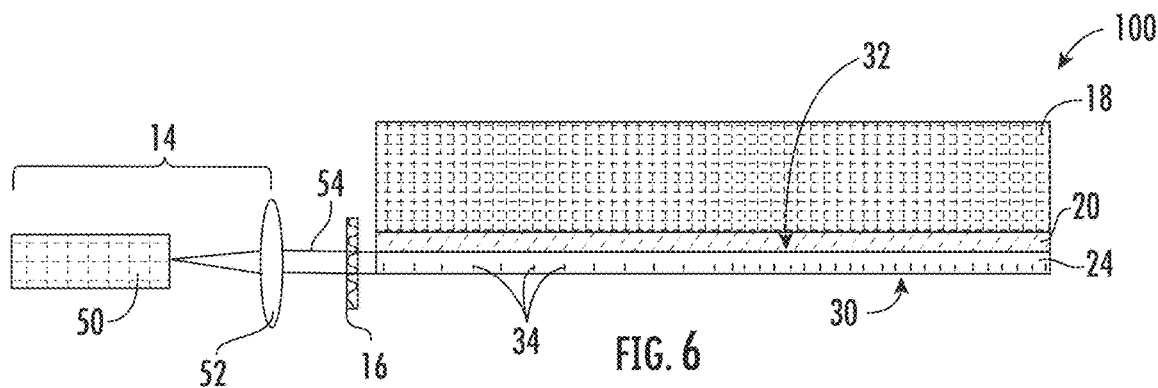
FIG. 6 is a side view of an illumination system including a light guide plate, according to another exemplary embodiment.

In FIG. 2, the IR of the material of waveguide sheet 24 is assumed to be 1.5 and the vertical axis is the limiting angle of the light source in a plane perpendicular (normal) to the major surface of sheet 24. Thus, as can be seen in FIG. 2, as the IR of the adjacent layer (either a glass cladding layer 26 or 28 or an optical adhesive layer 20 as shown in FIG. 6) gets closer to the IR of the material of waveguide sheet 24, the limiting angle of the light source decreases. This decrease represents a greater need to control the angular range of the light source with in a plane perpendicular to the major surfaces of waveguide sheet 24 to maintain TIR propagation.

In various embodiments, referring back to FIG. 1, waveguide sheet 24 is formed from a first glass material, and cladding layers 26 and/or 28 are formed from a second glass material different from the first glass material. In such embodiments, the first glass material has a first index of refraction and the second glass material has a second index of refraction. In such embodiments, the first index of refraction is greater than the second index of refraction. In specific embodiments, a difference between the first index of refraction and the second index of refraction is between 0.01 and 0.2. In specific embodiments, a difference between the first index of refraction and the second index of refraction is >0.01, preferably >0.05, or more preferably >0.1, and in specific embodiments, is also less than 0.2.

In various embodiments, the first glass material of waveguide sheet 24 may be a wide variety of glass materials. In specific embodiments, the first glass material of waveguide sheet 24 has a high transmittance, Tx, greater than 70% at wavelengths of light such as in the visible spectrum, such as between 550 nm through 500 mm, such as at 550 nm wavelength, such as at 500 mm wavelength, such at 770 nm wavelength, such as through the thickness of the sheet 24, such as through a distance of 1 mm, 5 mm, or other distances. In specific embodiments, waveguide sheet 24 may be formed from EagleXG glass, Gorilla Glass, or Iris Glass available from Corning, Inc. In some embodiments, the first glass material is a strengthened glass material. In one such embodiment, the first glass material is thermally tempered, and in another embodiment, the first glass material is chemically strengthened, such as through ion-exchange, or a combination of thermal tempering and chemical strengthening. In specific examples, central sheet can be made of an alkali aluminosilicate glass.

In various embodiments, the glass materials of sheet 24 and cladding layers 26 and 28 are drawable with a fusion process or with laminated fusion processes.

In specific embodiments, the relative coefficients of thermal expansion (CTE) of the different glass materials of layers 24, 26 and 28 may be chosen to provide a stronger laminate light guide plate 22 by having residual compressive stress in cladding layers 26 and 28. In other embodiments, the different glass materials of layers 24, 26 and 28 may CTEs that are equal to each other.

In various embodiments, the glass materials of sheet 24 and/or cladding 26 and 28 are suitable for strengthening via an ion-exchange process. In various embodiments, the glass material of cladding layers 26 and 28 does not need to have the same Tx as sheet 24, and in specific embodiments, the glass material of cladding 26 and 28 can have a Tx as low as 10% at wavelengths of 550 nm through 500 mm. In some embodiments, the glass material of cladding 26 and 28 has Tx>50% at wavelength of 550 nm through 500 mm and preferably, the glass material of cladding 26 and 28 can have Tx>70% at wavelength of 550 nm through 500 mm.

As noted above, because of the TIR challenges presented by the low IR differential between waveguide sheet 24 and the adjacent layers, Applicant has further designed system 10 to accommodate TIR given use of such materials. Referring to FIG. 1, light source 14 is optically coupled to a minor edge surface of waveguide sheet 24, shown as vertical edge surface 40. As will be understood, surface 40 extends between major surfaces 30 and 32 and defines the perimeter of light guide sheet 24. As shown in FIG. 1, in order to allow TIR, light source 14 is configured to limit the angle of incident light in the direction of a plane perpendicular to major surfaces 30 and 32 (e.g., the vertical direction in FIG. 1). As represented in FIG. 2, this allows the angle of incoming light to be below the limiting angle, and therefore allows for total internal reflection of light from light source 14 within light guide sheet 24.

In such embodiments to provide a light source 14 with the desired emission angle in the vertical direction, light source includes a laser diode 50 and a collimator 52 directing light to narrow planar region (i.e., region bounded by generally perpendicular planes, such as sheet). Collimator 52 is located between laser diode 50 and optical element 16, and optical element 16 is located between collimator 52 and vertical edge surface 40 of waveguide sheet 24. In this manner light from laser diode 50 pass first through collimator 52 before passing through optical element 16.

In general, laser diode 50 is a high brightness device with a relatively low angular emission of light 54 exiting collimator 52. In specific embodiments, a substantial portion (e.g., 70%, 90%, 99%, 99.9%, etc.) of light 54 exiting collimator 52 has an angular emission in a plane parallel to the minor edge surface 40 (e.g., the vertical direction in the orientation of FIG. 1) that is less than a critical angle of the light guide sheet 24 at the first and second major surfaces 30 and 32, where light exits the first and second major surfaces 30 and 32 if above the critical angle. This narrow/limited vertical angular emission is represented by the horizontal and parallel shape of light 54 shown in FIG. 1. Thus, Applicant has found that a relatively low angular emission of light can be achieved by utilizing laser diode 50 and collimator 52, and this provides for improved light coupling and TIR as compared to a lighting system that uses typical LED light sources, which have relatively high angular emissions.

In various embodiments, light source 14 may be a single color light source. In other embodiments, light source 14 may be a multi-color light source. In some such embodiments light source 14 may include multiple laser diodes to generate the different colors desired.

Illumination system 10 may include various components used to operate light source 14 and specifically laser diodes 50. In various embodiments, illumination system 10 includes power supply(s), electrical driver(s) and/or control system(s) for operating laser diode 50. In addition, illumination system 10 may include one or more heat sink(s) to dissipate heat from laser diodes. In addition, illumination system 10 may include various housing components for supporting the various components and/or for coupling illumination system 10 to an adjacent device housing, such a vehicle body as shown below in FIG. 14.

In various embodiments, laser diode 50 has a central wavelength in the range of 400-700 nm. In other embodiments, light source 14 is an LED, EELED or SLED with a central wavelength in the range of 400-700 nm. In some embodiments, light source 14 is includes an LED and collimator.

In various embodiments, light source 14 is an array of laser diodes. In various embodiments, light source 14 is a combination of red, green and blue laser diodes. In various embodiments, light source 14 includes a plurality of multi-colored laser diodes that are controlled independently to produce any color combination of light. In various embodiments, light source 14 includes laser diodes in which the laser wavelengths and bandwidths are chosen to minimize speckle. In some embodiments, Fabry-Perot or other broadband laser sources can be used to reduce speckle. In other embodiments, multiple lasers of the same wavelength can decrease speckle because they lack mutual coherence.

In some embodiments light source 14 may be polarized, and in such embodiments, the orientation of the polarization axis can be chosen to optimize the scattering and luminance.

Circular polarizers or other wave plate optics may be introduced to rotate or otherwise modify the input polarization of the light.

In various embodiments, laser diode 50 and/or light guide plate 22 are further designed to facilitate coupling of light into light guide plate 22. In a specific embodiment, waveguide sheet 24 defines a numerical aperture, and light source 14 defines a numerical aperture. In such embodiments, the numerical aperture of the light source is less than the numerical aperture of the waveguide sheet 24.

Further, laser diode 50 may be configured to provide sufficiently high levels of illumination while limiting the number of light sources required to provide the desired level of illumination. In such embodiments, laser diode 50 has a high brightness. In contrast to light guide plate arrangements utilizing LED light sources, in specific embodiments utilizing laser diode(s), system 10 can generate a desired level of illumination utilizing fewer total light sources due to the relatively high brightness of laser diode 50 compared to typical LED light sources.

Referring to FIG. 1 and FIG. 3, function of optical element 16 is described in detail. As described above, in order to provide for TIR within waveguide sheet 24, the light from laser diode 50 is collimated. While this provides for good TIR propagation and light coupling into waveguide sheet 24, collimated light does not provide for good spatial distribution in the width and length directions within waveguide sheet 24. Thus, to enhance this light distribution, optical element 16 is configured to increase an angular emission of light from light source 14 in a plane perpendicular to edge surface 40. Thus, in the orientation of FIG. 1, optical element 16 is configured to increase an angular emission of light from the light source in a horizontal plane perpendicular to edge surface 40, and this increase is shown in the top view of FIG. 3 as the fan-shape of the light exiting optical element 16. In a specific embodiment, optical element 16 increases the angular emission of light from the light source to at least 90 degrees in the plane perpendicular to the edge surface 40.

Figure 11:
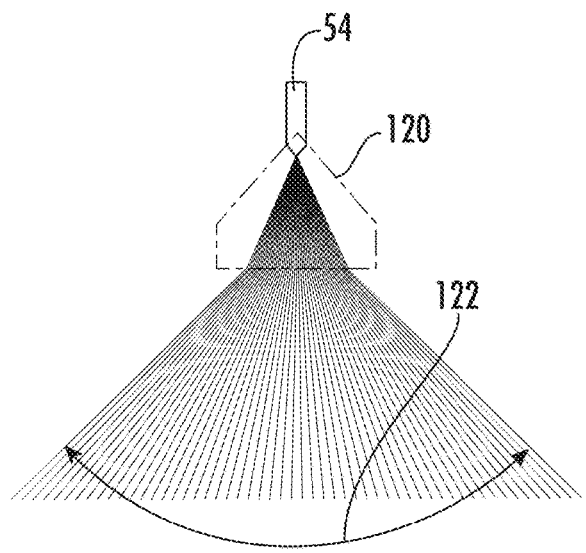
FIG. 11 is a schematic view showing an optical element configured to increase an angular emission of light from the light source, according to an exemplary embodiment.
Figure 12:
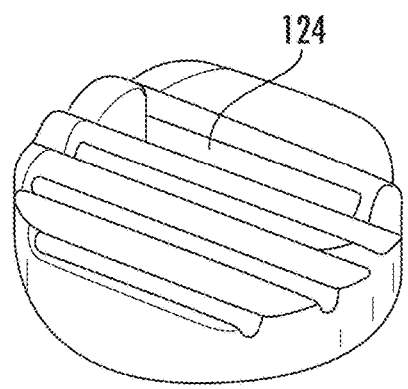
FIG. 12 is a perspective view of an optical element configured to increase an angular emission of light from the light source, according to another exemplary embodiment.
Figure 13:
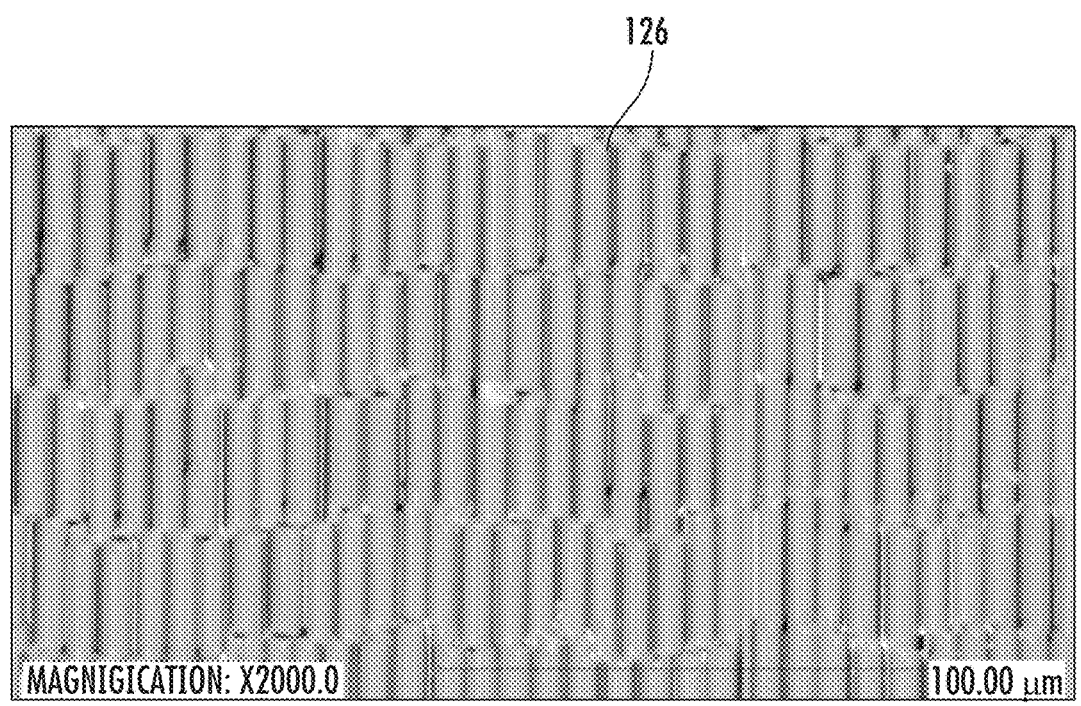
FIG. 13 is a photograph of an optical element configured to increase an angular emission of light from the light source, according to another exemplary embodiment.

In various embodiments, optical element 16 is a lens, a diffractive optical element, a diffraction grating, a lens array, a lenticular array, a phase plate, or a combination of these elements that provide the angular increase discussed above. In various embodiments, optical element 16 includes one or more circular, cylindrical, holographic, diffractive and/or aspheric lenses used to modify the beam shape and/or numerical aperture of light from light source 14. As will be discussed in more detail below, FIGS. 11-13 show specific embodiments of optical element 16.

Light guide plate 22 is further configured to facilitate coupling of light exiting optical element 16 into light guide plate 22. Specifically, vertical edge surface 40 includes a non-planar section (i.e., wherein sides are not substantially parallel), shown as semi-circular section 60, facing optical element 16. In general, semi-circular section 60 is shaped such that light exiting optical element 16 is more effectively coupled into waveguide sheet 24 through the semi-circular section 60. As shown in FIG. 3, because optical element 16 increases the angle of light in the horizontal plane, semi-circular section 60 limits the amount of light refracted and/or reflected at this surface, and therefore increases coupling of light into sheet 24 by decreasing the angle of incidence of light in the horizontal plane. In a specific embodiment, the surface within section 60 is polished to improve coupling of light into light guide plate 22.

In a specific embodiment, semi-circular section 60 is shaped such that an angle of incidence of a majority of light exiting optical element 16 on the surface of section 60 is such that less than 10% of light from the light source is reflected from the minor edge surface back towards the optical element It should be understood that while the non-planar section in edge surface 40 is shown as a semi-circular shape, section 60 may have other reflection/refraction reducing shapes, such as a polygonal shape approximating a circular shape.

Figure 4:
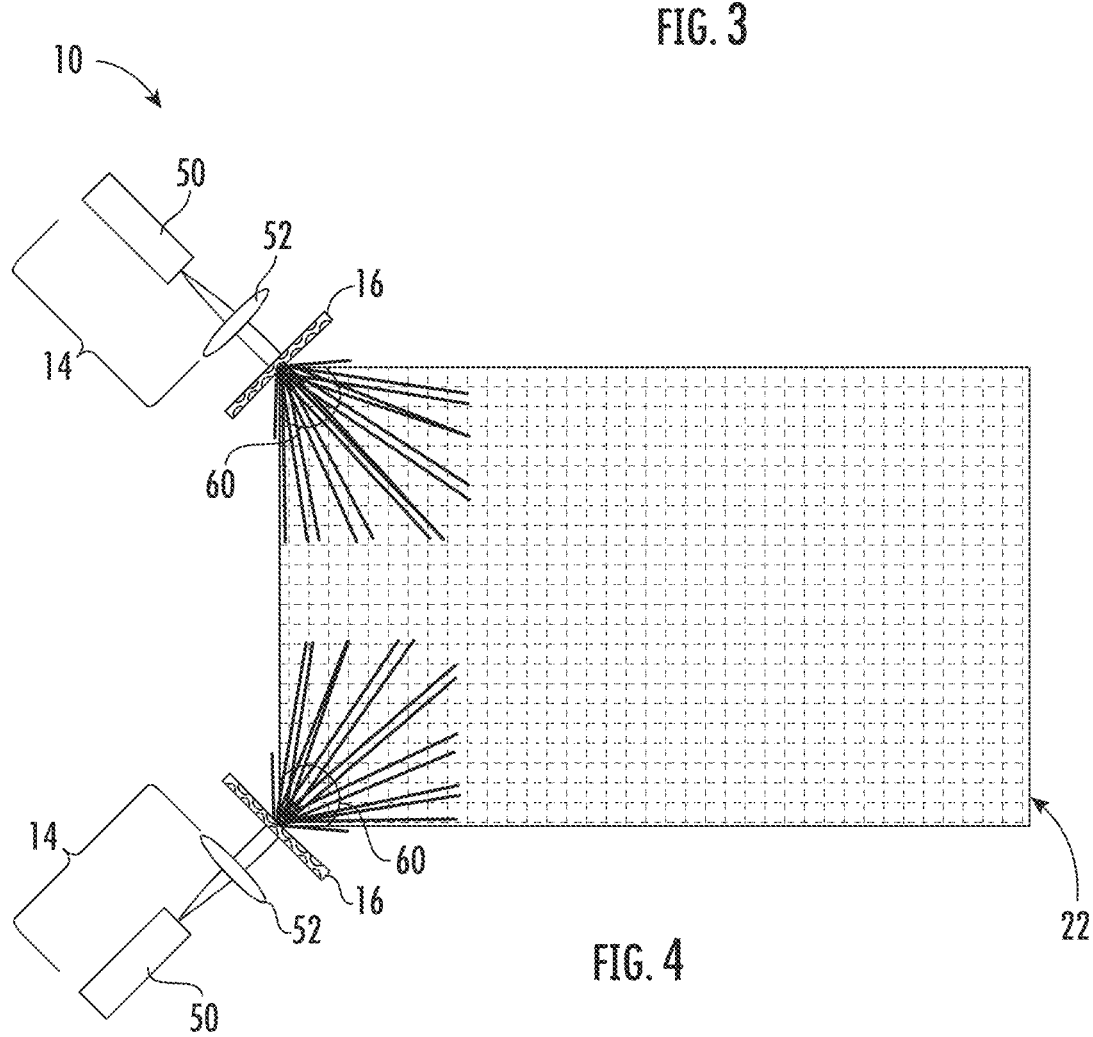
FIG. 4 is a top view of the illumination system of FIG. 1, according to another exemplary embodiment.

Referring to FIG. 4, in various embodiments as noted above, transparent illumination system 10 may include multiple light sources 14 located around the perimeter of light guide plate 22. In such embodiments, each light source 14 includes its own optical element 16 that faces its own non-planar surface section, shown as semi-circular sections 60, formed in edge surface 40. In a particular embodiment, light sources 14 face the corners of light guide plate 22, and semi-circular sections 60 are located in the corners of light guide plate 22. In other embodiments, light sources 14 with semi-circular sections 60 are located at three or four corners of light guide plate 22.

In some embodiments, portions of edges surface 40 outside of semi-circular section 60 may be coated with a reflective coating (specular tape or thin film) in order to reduce or prevent light leakage from the edge surface of light guide plate 22.

Figure 5:
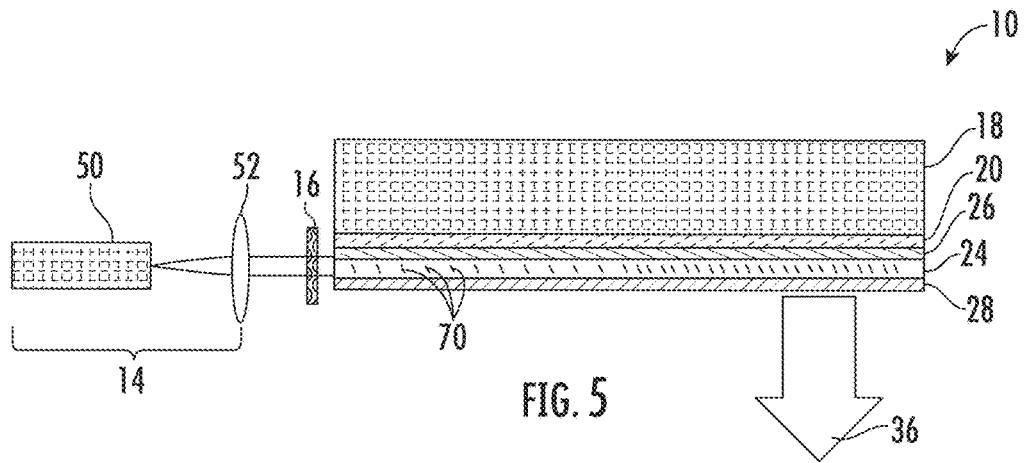
FIG. 5 is a side view of an illumination system including a light guide plate, according to another exemplary embodiment.

Referring to FIG. 5, in some embodiments, waveguide sheet 24 includes an engineered pattern of light extraction features 70. LEFs 70 are substantially the same as LEFs 34 and act to scatter light towards interior direction 36. LEFs 70 are at a non-perpendicular angle to major surfaces 30 and 32 of sheet 24. In a specific embodiment, LEFs 70 are at an angle between 0 and 30 degrees and more specifically between 10 and 30 degrees, relative to major surfaces 30 and 32 of sheet 24. In one such embodiment, LEFs 70 are positioned within sheet 24 in a pattern that produces uniform spatial illumination in the direction of arrow 36. In another such embodiment, LEFs 70 are positioned within sheet 24 in a pattern of light extractors produces a desired non-uniform spatial illumination pattern.

Referring to FIG. 6, an illumination system 100 is shown according to an exemplary embodiment. Illumination system 100 is substantially the same as illumination system 10 discussed above, except for the differences discussed herein. In this embodiment, illumination system 100 includes a single layer light diffusing, light guide plate formed from waveguide sheet 24, as discussed above. In this embodiment, no glass cladding layers 26 and 28 are coupled to sheet 24, and thus, polymer interlayer 20 is bonded directly to major surface 32 of waveguide sheet 24, and major surface 30 defines one of the exterior surfaces of the glass laminate article 12.

In this embodiment, waveguide sheet 24 is formed from a first glass material, and polymer interlayer 20 is an optical adhesive material. In such embodiments, the first glass material has a first index of refraction and polymer interlayer 20 has a second index of refraction, and the first index of refraction is greater than the second index of refraction. In specific embodiments, a difference between the first index of refraction and the second index of refraction is between 0.01 and 0.2. In specific embodiments, refractive index of the glass material of waveguide sheet 24 is such that the refractive index is greater than the refractive index of polymer interlayer 20 to which it may be laminated. In various embodiments, this difference in refractive indices >0.01, preferably >0.05, or more preferably >0.1, and in specific embodiments, is also less than 0.2.

Figure 7:
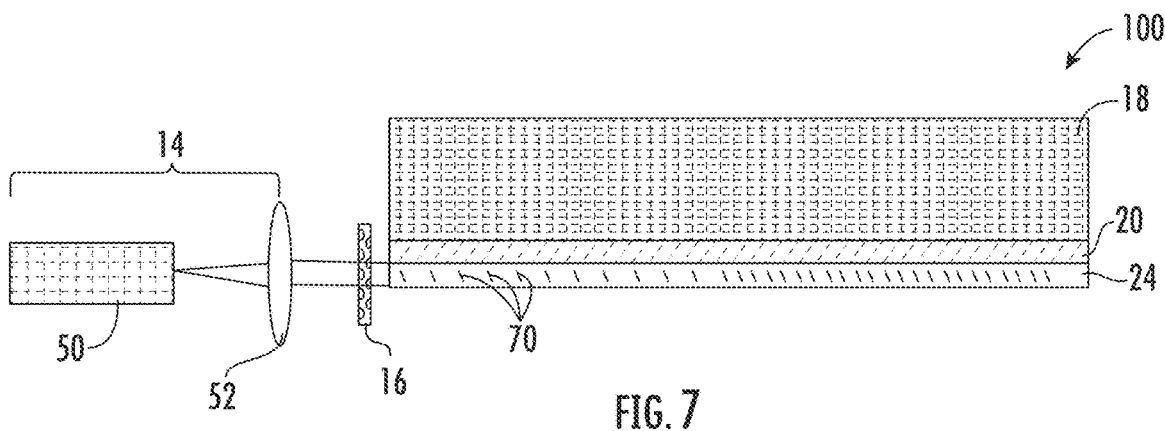
FIG. 7 is a side view of an illumination system including a light guide plate, according to another exemplary embodiment.

Referring to FIG. 7, in this embodiment of illumination system 100, waveguide sheet 24 includes an engineered pattern of light extraction features 70. LEFs 70 are substantially the same as LEFs 34 and act to scatter light towards interior direction 36. As discussed above, LEFs 70 are angled, and, as shown in FIG. 7 have increasing density away from light source 14.

Figure 8:
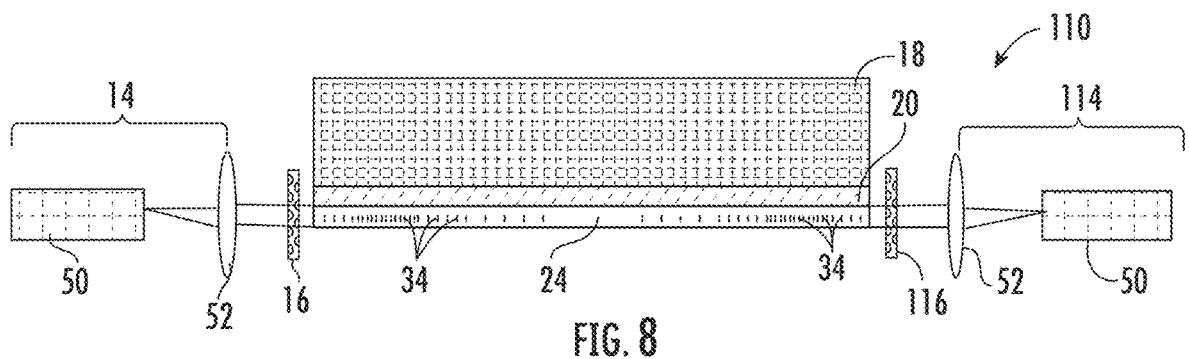
FIG. 8 is a side view of an illumination system including a light guide plate, according to another exemplary embodiment.
Figure 9:
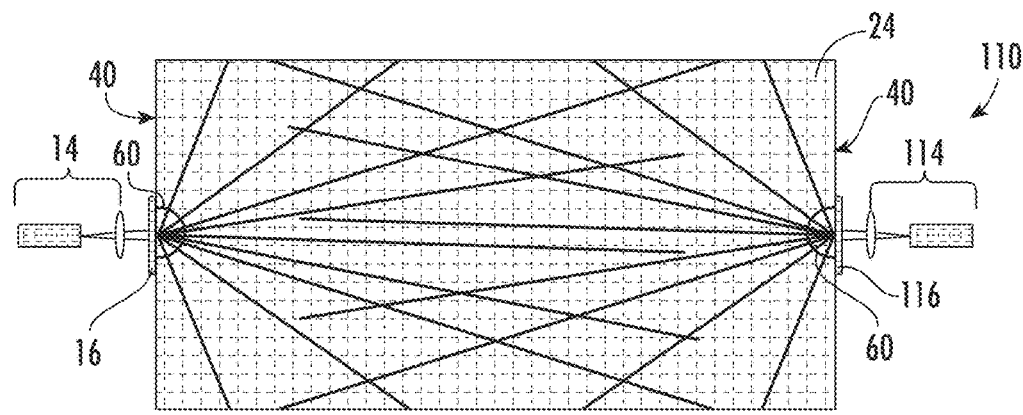
FIG. 9 is a top view of the illumination system of FIG. 8, according to an exemplary embodiment.

Referring to FIGS. 8 and 9, an illumination system 110 is shown according to an exemplary embodiment. Illumination system 110 is substantially the same as illumination system 100 discussed above, except for the differences discussed herein. Illumination system 110 includes a first light source 14 and a second light source 114. Light source 114 is substantially the same as light source 14 except that it is positioned along one of the other edges of waveguide sheet 24. In the specific embodiment shown, light source 14 and light source 114 are located on opposite edges of waveguide sheet 24. Light from light source 114 is fanned out via an additional optical element 116, that is similar to optical element 16. In this embodiment, LEFs 34 are arranged in a pattern/distribution within waveguide sheet 24 to account for the positioning of light sources 14 and 114.

Figure 10:
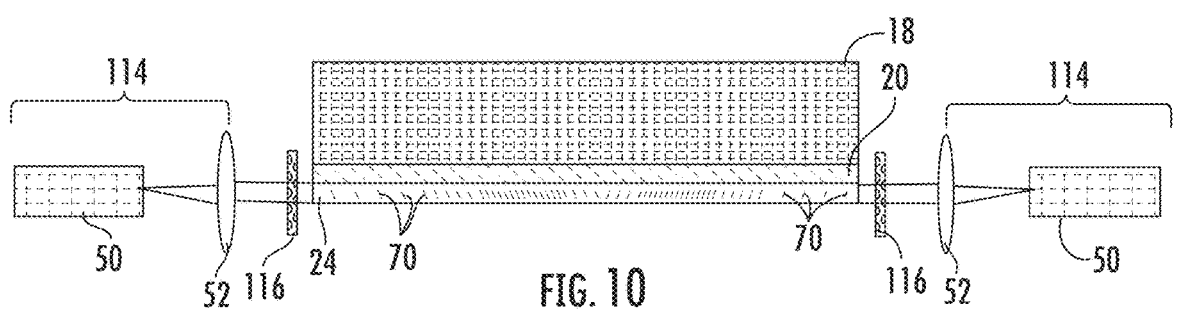
FIG. 10 is a side view of an illumination system including a light guide plate, according to another exemplary embodiment.

Referring to FIG. 10, in this embodiment of illumination system 110, waveguide sheet 24 includes an engineered pattern of light extraction features 70. LEFs 70 are substantially the same as LEFs 34 shown in FIG. 8 and act to scatter light towards interior direction 36. As discussed above, LEFs 70 are angled, and, as shown in FIG. 7 have increasing density toward the center of waveguide sheet 24.

Referring to FIGS. 11-13, specific devices that can be used as optical elements 16 are shown. Referring to FIG. 11, in one embodiment, optical element 16 is a Powell lens 120 that causes the light from the light source to increase its angle in the desired plane as shown by fan angle 122. As noted above fan angle 122 of any of the optical elements discussed herein may be 90 degrees or greater, and specifically may be less than 180 degrees. Referring to FIG. 12, in one embodiment, optical element 16 is one or more lenticular-array lens 124. Referring to FIG. 13, in one embodiment, optical element 16 is an engineered diffuser 126.

Figure 14:
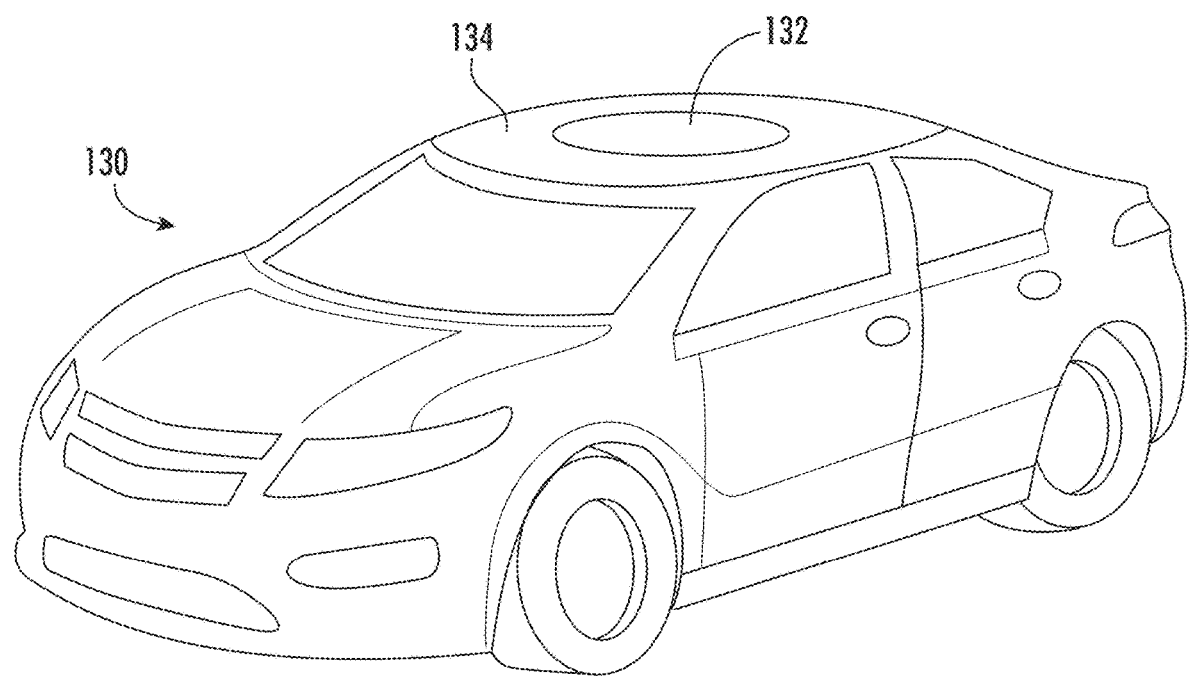
FIG. 14 is a perspective view of a vehicle incorporating an illumination system with a light guide plate into one or more glass component, such as a vehicle sunroof, according to an exemplary embodiment.

Referring to FIG. 14, a vehicle 130 is shown equipped with one or more glass component having one or more of the transparent illumination system embodiments discussed herein. In such embodiments, one or more of the transparent illumination systems discussed herein form part of illuminated automotive glass system. In a specific embodiment, vehicle 130 includes an illuminated automotive glass system, shown as an illuminated sunroof 132. In general, sunroof 132 is formed from glass laminate article 12 discussed herein, and the remaining components of the illumination system associated with article 12 are supported by vehicle body 134.

As part of an illuminated automotive glass system, glass laminate article 12 may include additional functional layers and/or functional coatings that may be utilized in an automotive glass application. In specific embodiments, glass laminate article 12 may include dynamic tinting films, and structural glass layer 18 may be a tinted or untinted soda lime glass layer. In specific embodiments, glass laminate article 12 may include a dynamic tint layer and in such embodiments, this layer could be a suspended particle device (SPED), a polymer dispersed liquid crystal (PLC.) or an organic electrochromic (EC). In some such embodiments, cladding layer 26 prevents optical coupling of the dynamic tint layer to light guide plate 22.

Internal Extraction Features Details

As noted above, in order to extract light from the light guide plate, a pattern of light extraction features (LEFs) may be engineered into the central region of waveguide sheet 24. One approach is to scan a high-intensity pulsed laser to write sub-surface LEFs into the center of the light guide plate. In the laminated glass, this may be in the core layer (e.g., sheet 24 discussed above), but in some embodiments may extend into the cladding layers. The LEFs may be written in a single layer in the glass thickness, or multiple layers may be stacked up to increase the length. The properties of such features can be modified by controlling parameters such as the average laser power, laser intensity, laser pulse energy, laser pulse duration, the beam depth of focus (Rayleigh range), laser wavelength, and number of laser pulses. Lasers with wavelengths between 200 nm-1500 nm can be used. Pulse lengths from 10-fs to 10 ns can be used. The beam spatial profile can be Gaussian or a beam profile that produces a quasi-non-diffracting beam such as a quasi-Bessel beam. This beam can be approximately circular or elliptical in shape to produce LEFs with a symmetric or asymmetric cross-sectional geometry.

As noted above, for at least some applications, laser-induced LEFs are sub-surface features. If the features intersect the glass surface, the strength of the glass may be compromised and moisture in the environment may lead to spontaneous fracturing of the glass.

The LEFs can be a relatively small modification of the local refractive index $\Delta n<0.01$, or can be as large as an air void with $n\sim1.0$. Each LEF may have a cross-section for scattering and a scattering strength that can be used to design the gradient pattern of multiple LEFs across the light guide plate. The pattern is chosen to achieve a target luminance across the light guide plate. That luminance may be approximately uniform across the light guide plate. In other embodiments, it may be maximized in the center with a fall off towards the edges, but it may be designed to have a variety of other desired luminance distributions. This engineered pattern may be formed by changing the density (or spacing) of the LEFS, the cross-sectional size of the individual LEFs, the length of the LEFs, or the index change of the LEFs. Optical design tools such as LightTools, SPEOs or ZEMAX can be used to design the light extraction pattern.

In order to determine the parameters of the scattering strength of the LEFs, a uniform LEF pattern can be made in a test light guide plate. Using this patterned light guide plate and an edge-launched light source, the exponential decay of the extracted light can be measured with an external camera or a scanning detector. The decay coefficient can be used in the design software to determine the desired pattern for the final light guide plate. For a curved (non-planar) light guide plate, the extraction pattern is designed in a similar manner.

To improve the light extraction angles, the LEFs may be at an angle to the output surface of the light guide plate. This can be accomplished by angling the laser beam that produces the LEF. The final angle of the LEF is determined by the input angle of the beam and the refraction within the glass. Achieving angles $>20°$ is difficult because of the impact of refraction. At these higher angles, the beam shape might require modification in order to maintain the appropriate laser parameters for the formation of LEFs inside the glass. Higher internal angles would utilize prism structures that are index-matched and moved with the LEF-writing laser. On curved light guide plates, the LEF angle can vary in relation to the local curvature.

Optical Testing

The final assembly can be tested for optical performance by using an imaging colorimeter or scanning spectroradiometer to evaluate the luminance pattern of the extracted light.

Optical Non-Destructive Measurement of LEFs Using Dark Field Illumination

An alternative method to characterize and measure the scattering properties of LEFs is described. In general, the method consists of three main steps. First, illuminating the samples in dark field mode, typically via edge coupling, that can be coherent or non-coherent. Second, imaging the features with a microscope objective with a depth of field longer than the thickness of the substrate (taking into account optical thickness and incidence angle). Third, collecting the images with a CMOS or CCD camera. The resulting three-dimensional projection allows for quantification of light scattering properties of LEFs such as scattering intensity, location in the bulk of the substrate, existence of surface damage, LEF length, orientation, directionality, etc. A line-scan camera can also be used in combination with precise motion stages to collect images larger than the field of view of the camera and inspect larger samples in a short amount of time.

It should be understood that while the disclosure herein discusses the light guide plate and/or illumination system primarily in the context an automotive sunroof, other applications are contemplated. The designs and concepts discussed here are useful in any transparent illumination system application in which a light diffusing, light guide layer is located adjacent to high refractive index materials and/or is subject to surface degradation, such as dirt, water droplets, fingerprints, etc. In such applications, the designs discussed herein improve waveguide function and/or light diffusion out of the transparent structure of the illuminating system. In further embodiments, the transparent illumination devices discussed herein can be incorporated into a wide variety of architectural or aesthetic designs. In one embodiment, the transparent illumination devices discussed herein provide signage for a window of a business. In another embodiment, the transparent illumination devices discussed herein provide customizable wall color for a building such that the transparent illumination devices discussed herein can be illuminated in different colors.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. For example, contemplated LEFs may include embedded structures of a material with higher melting temperature than surrounding glass material, crystals grown within the glass material, mechanically induced cracks in the glass material, etc., and LEFs may have a dimension (e.g., length, width, thickness, height) of at least 10 nm, such as at least 100 nm, such as no more than the thicknesses of the light diffusing, light guide layers disclosed herein. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

Aspect (1) of this disclosure pertains to a transparent illumination system comprising: a light diffusing, light guide layer comprising: a first glass material; a first major surface; a second major surface opposite the first major surface; a minor edge surface connecting the first major surface to the second major surface; and a plurality of light extraction features; a strengthened structural glass layer coupled to the light guide layer; a light source optically coupled to the minor edge surface of the light guide layer; and an optical element located between the light source and the minor edge surface of the light guide layer, the optical element configured to facilitate spreading of light from the light source in a plane normal to the minor edge surface; wherein light from the light source is transmitted across the light guide layer via total internal reflection, and the light extraction features are configured to direct light out of the light guide layer and through the first major surface.

Aspect (2) of this disclosure pertains to the transparent illumination system of Aspect (1), wherein the light source comprises a laser diode and the optical element increases the angular emission of light from the light source to at least 90 degrees in the plane perpendicular to the minor edge surface.

Aspect (3) of this disclosure pertains to the transparent illumination system of Aspect (2), wherein the light source comprises a collimator located between the laser diode and the optical element, wherein light from the light source exiting the collimator has an angular emission in a plane parallel to the minor edge surface that is less than a critical angle of the light guide layer at the first and second major surfaces.

Aspect (4) of this disclosure pertains to the transparent illumination system of Aspect (2) or Aspect (3), wherein the light guide layer defines a numerical aperture and the laser diode defines a numerical aperture, wherein the numerical aperture of the light source is less than the numerical aperture of the light guide layer.

Aspect (5) of this disclosure pertains to the transparent illumination system of any one of Aspects (1) through (4), wherein the minor edge surface includes a non-planar section facing the optical element such that light exiting the optical element is coupled into the light guide layer through the non-planar section.

Aspect (6) of this disclosure pertains to the transparent illumination system of Aspect (5), wherein the non-planar section of the minor edge surface is shaped to have a semi-circular shape.

Aspect (7) of this disclosure pertains to the transparent illumination system of any one of Aspects (1) through (6), further comprising an intermediate layer directly coupled to the second major surface of the light guide layer and located between the second major surface of the light guide layer and the strengthened structural glass layer.

Aspect (8) of this disclosure pertains to the transparent illumination system of Aspect (7), wherein the first glass material of the light guide layer has a first index of refraction and the intermediate layer has a second index of refraction, wherein the first index of refraction is greater than the second index of refraction and a difference between the first index of refraction and the second index of refraction is greater than 0.01.

Aspect (9) of this disclosure pertains to the transparent illumination system of Aspect (8), wherein the intermediate layer is a layer of optical adhesive that bonds the strengthened structural glass layer to the light guide layer.

Aspect (10) of this disclosure pertains to the transparent illumination system of Aspect (8), wherein the intermediate layer is a glass cladding layer formed from a second glass material that is different from the first glass material of the light guide layer.

Aspect (11) of this disclosure pertains to the transparent illumination system of Aspect (10), further comprising a second glass cladding layer coupled to the first major surface of the light guide layer, wherein the second glass cladding layer has a third index of refraction, wherein the first index of refraction is greater than the third index of refraction and a difference between the first index of refraction and the third index of refraction is greater than 0.01.

Aspect (12) of this disclosure pertains to the transparent illumination system of any one of Aspects (1) through (11), wherein the light guide layer further comprises: a central region; a first exterior region between the central region and the first major surface; and a second exterior region between the central region and the second major surface; wherein the light extraction features are located in the central region and the first and second exterior regions are substantially devoid of light extraction features.

Aspect (13) of this disclosure pertains to the transparent illumination system of Aspect (12), wherein the light extraction features are laser-induced subsurface features having an index of refraction that is different than adjacent region of the first glass material.

Aspect (14) of this disclosure pertains to a plate configured for guiding and diffusing light, the plate comprising: a first glass material of the plate; a first major surface of the plate; a second major surface of the plate opposite the first major surface; a minor edge surface connecting the first major surface to the second major surface; a central region located between the first and second major surfaces; a first exterior region extending from the central region to the first major surface; a second exterior region extending from the central region to the second major surface; a thickness measured between the first major surface and the second major surface of 0.3 mm to 5 mm; a width normal to the thickness, the width greater than 20 cm; a length normal to the thickness and the width, the length greater than 20 cm; a high transmittance of the plate at least through the thickness greater than 70% at wavelengths of light between 550 nm through 500 mm; and a plurality of light extraction features of the plate, wherein most of the light extraction features are located in the central region.

Aspect (15) of this disclosure pertains to the plate of Aspect (14), further comprising a first cladding layer formed from a second glass material that is different from the first glass material, the first cladding layer directly coupled to the first major surface, wherein the first glass material has a first index of refraction and the second glass material has a second index of refraction, wherein the first index of refraction is greater than the second index of refraction and a difference between the first index of refraction and the second index of refraction is between 0.01 and 0.2.

Aspect (16) of this disclosure pertains to the plate of Aspect (14) or Aspect (15), wherein the minor edge surface includes a non-planar section configured to receive light exiting an optical element to couple the light into the central region.

Aspect (17) of this disclosure pertains to a plate for guiding and diffusing light, the plate comprising: a central glass layer comprising: a first glass material; a first major surface; a second major surface opposite the first major surface; a minor edge surface connecting the first major surface to the second major surface; and a plurality of light extraction features configured to direct light out of the central glass layer and through the first major surface; and a first cladding layer formed from a second glass material different from the first glass material, the first cladding layer directly coupled to the first major surface; wherein the first glass material has a first index of refraction and the second glass material has a second index of refraction, wherein the first index of refraction is greater than the second index of refraction and a difference between the first index of refraction and the second index of refraction is greater than 0.01 and 0.2.

Aspect (18) of this disclosure pertains to the plate of Aspect (17), further comprising a second cladding layer formed from the second glass material different, the second cladding layer directly coupled to the first major surface.

Aspect (19) of this disclosure pertains to the plate of Aspect (18), further comprising a thickness measured between the first major surface and the second major surface of the central glass layer of 0.3 mm to 5 mm, and thicknesses of the first and a second cladding layers are between 1 micrometer and 1000 micrometers.

Aspect (20) of this disclosure pertains to the plate of Aspect (19), further comprising: a width is greater than 20 cm; and a length is greater than 20 cm; wherein the first glass material comprises a high transmittance, the transmittance greater than 70% at least through the thickness at wavelengths of light between 550 nm through 500 mm.

Aspect (21) of this disclosure pertains to the plate of any one of Aspects (17) through (20), wherein the central glass layer comprises: a central region; a first exterior region between the central region and the first major surface; and a second exterior region between the central region and the second major surface; wherein the light extraction features are located in the central region and the first and second exterior regions are substantially devoid of light extraction features.

Aspect (22) of this disclosure pertains to the plate of any one of Aspects (17) through (21), wherein the minor edge surface includes a non-planar shaped section configured to receive light exiting an optical element to couple the light into the central region.

Aspect (23) of this disclosure pertains to an illuminated automotive glass system comprising: a light diffusing, light guide layer comprising: a first glass material; a first major surface; a second major surface opposite the first major surface; a minor edge surface connecting the first major surface to the second major surface; and a plurality of light extraction features; a strengthened structural glass layer coupled to the light guide layer; an optical adhesive layer coupling the strengthened structural glass layer to the second major surface; a light source optically coupled to the minor edge surface of the light guide layer; an optical element located between the light source and the minor edge surface of the light guide layer configured to increase an angular emission of light from the light source in a plane perpendicular to the minor edge surface; and a tint layer coupled to the strengthened structural glass layer; wherein the strengthened structural glass layer has a thickness of 0.5 to 4 mm; wherein light from the light source is transmitted through the light guide layer via total internal reflection, and the light extraction features are configured to direct light out of the light guide layer and through the first major surface.

What is claimed is:

1. A transparent illumination system comprising:
a light diffusing, light guide layer comprising:
a first glass material;
a first major surface;
a second major surface opposite the first major surface;
a minor edge surface connecting the first major surface to the second major surface; and
a plurality of light extraction features;
a strengthened structural glass layer coupled to the light guide layer;
a light source optically coupled to the minor edge surface of the light guide layer;
an optical element located between the light source and the minor edge surface of the light guide layer, the optical element configured to facilitate spreading of light from the light source in a plane normal to the minor edge surface; and
an intermediate layer directly coupled to the second major surface of the light guide layer and located between the second major surface of the light guide layer and the strengthened structural glass layer,
wherein the first glass material of the light guide layer has a first index of refraction and the intermediate layer has a second index of refraction,
wherein the first index of refraction is greater than the second index of refraction and a difference between the first index of refraction and the second index of refraction is greater than 0.01,
wherein the intermediate layer is a glass cladding layer formed from a second glass material that is different from the first glass material of the light guide layer,
wherein light from the light source is transmitted across the light guide layer via total internal reflection, and the light extraction features are configured to direct light out of the light guide layer and through the first major surface.

2. The transparent illumination system of claim 1, wherein the light source comprises a laser diode and the optical element increases the angular emission of light from the light source to at least 90 degrees in the plane perpendicular to the minor edge surface.

3. The transparent illumination system of claim 2, wherein the light source comprises a collimator located between the laser diode and the optical element, wherein light from the light source exiting the collimator has an angular emission in a plane parallel to the minor edge surface that is less than a critical angle of the light guide layer at the first and second major surfaces.

4. The transparent illumination system of claim 2, wherein the light guide layer defines a numerical aperture and the laser diode defines a numerical aperture, wherein the numerical aperture of the light source is less than the numerical aperture of the light guide layer.

5. The transparent illumination system of claim 1, wherein the minor edge surface includes a non-planar section facing the optical element such that light exiting the optical element is coupled into the light guide layer through the non-planar section.

6. The transparent illumination system of claim 5, wherein the non-planar section of the minor edge surface is shaped to have a semi-circular shape.

7. The transparent illumination system of claim 1, further comprising a second glass cladding layer coupled to the first major surface of the light guide layer, wherein the second glass cladding layer has a third index of refraction, wherein the first index of refraction is greater than the third index of refraction and a difference between the first index of refraction and the third index of refraction is greater than 0.01.

8. The transparent illumination system of claim 1, wherein the light guide layer further comprises:
a central region;
a first exterior region between the central region and the first major surface; and
a second exterior region between the central region and the second major surface;
wherein the light extraction features are located in the central region and the first and second exterior regions are substantially devoid of light extraction features.

9. The transparent illumination system of claim 8, wherein the light extraction features are laser-induced sub-surface features having an index of refraction that is different than adjacent region of the first glass material.

10. A plate configured for guiding and diffusing light, the plate comprising:
a first glass material of the plate;
a first major surface of the plate;
a second major surface of the plate opposite the first major surface;
a minor edge surface connecting the first major surface to the second major surface;
a central region located between the first and second major surfaces;
a first exterior region extending from the central region to the first major surface;
a second exterior region extending from the central region to the second major surface;
a thickness measured between the first major surface and the second major surface of 0.3 mm to 5 mm;
a width normal to the thickness, the width greater than 20 cm;
a length normal to the thickness and the width, the length greater than 20 cm;
a high transmittance of the plate at least through the thickness greater than 70% at wavelengths of light between 550 nm through 500 mm;
a plurality of light extraction features of the plate, wherein most of the light extraction features are located in the central region, wherein the plurality of light extraction features are sub-surface features that are positioned within the first glass material, and
a first cladding layer formed from a second glass material that is different from the first glass material, the first cladding layer directly coupled to the first major surface, wherein the first glass material has a first index of refraction and the second glass material has a second index of refraction, wherein the first index of refraction is greater than the second index of refraction and a difference between the first index of refraction and the second index of refraction is between 0.01 and 0.2.

11. The plate of claim 10, wherein the minor edge surface includes a non-planar section configured to receive light exiting an optical element to couple the light into the central region.

12. An illuminated automotive glass system comprising:
a light diffusing, light guide layer comprising:
a first glass material;
a first major surface;
a second major surface opposite the first major surface;
a minor edge surface connecting the first major surface to the second major surface; and
a plurality of light extraction features;
a strengthened structural glass layer coupled to the light guide layer;

an optical adhesive layer coupling the strengthened structural glass layer to the second major surface;

a light source optically coupled to the minor edge surface of the light guide layer;

an optical element located between the light source and the minor edge surface of the light guide layer configured to increase an angular emission of light from the light source in a plane perpendicular to the minor edge surface;

a tint layer coupled to the strengthened structural glass layer; and an intermediate layer directly coupled to the second major surface of the light guide layer and located between the second major surface of the light guide layer and the strengthened structural glass layer, wherein the first glass material of the light guide layer has a first index of refraction and the intermediate layer has a second index of refraction, wherein the first index of refraction is greater than the second index of refraction and a difference between the first index of refraction and the second index of refraction is greater than 0.01, wherein the intermediate layer is a glass cladding layer formed from a second glass material that is different from the first glass material of the light guide layer, wherein the strengthened structural glass layer has a thickness of 0.5 to 4 mm;

wherein light from the light source is transmitted through the light guide layer via total internal reflection, and the light extraction features are configured to direct light out of the light guide layer and through the first major surface.

* * * * *